US012755148B2

(12) United States Patent
Verma et al.

(10) Patent No.: US 12,755,148 B2
(45) Date of Patent: Oct. 6, 2026

(54) KNOWLEDGE EXPANSION FOR IMPROVING MACHINE LEARNING

(71) Applicant: INTERNATIONAL BUSINESS MACHINES CORPORATION, Armonk, NY (US)

(72) Inventors: Dinesh C. Verma, New Castle, NY (US); Franck Vinh Le, West Palm Beach, FL (US); Michele Merler, New York City, NY (US); Dhiraj Joshi, Edison, NJ (US); Supriyo Chakraborty, White Plains, NY (US); Seraphin Bernard Calo, Cortlandt Manor, NY (US)

(73) Assignee: International Business Machines Corporation, Armonk, NY (US)

(*) Notice: Subject to any disclaimer, the term of this patent is extended or adjusted under 35 U.S.C. 154(b) by 882 days.

(21) Appl. No.: 17/935,198

(22) Filed: Sep. 26, 2022

(65) Prior Publication Data

US 2024/0104369 A1 Mar. 28, 2024

(51) Int. Cl.

| | |
|---|---|
| ***G06F 7/00*** | (2006.01) |
| ***G06F 16/00*** | (2019.01) |
| ***G06F 18/21*** | (2023.01) |
| ***G06F 18/213*** | (2023.01) |
| ***G06F 18/22*** | (2023.01) |
| ***G06N 3/08*** | (2023.01) |

(52) U.S. Cl.
CPC ............. *G06N 3/08* (2013.01); *G06F 18/213* (2023.01); *G06F 18/217* (2023.01); *G06F 18/22* (2023.01)

(58) Field of Classification Search
None
See application file for complete search history.

(56) References Cited

U.S. PATENT DOCUMENTS

| | | | | |
|---|---|---|---|---|
| 5,872,865 | A | 2/1999 | Normile | |
| 8,626,682 | B2 | 1/2014 | Malik | |
| 10,121,108 | B2 | 11/2018 | Miserendino | |
| 11,170,270 | B2 | 11/2021 | Merler | |
| 11,176,429 | B2 | 11/2021 | Brandes | |
| 2010/0063948 | A1* | 3/2010 | Virkar | G06N 20/10 707/769 |
| 2020/0364520 | A1* | 11/2020 | Brandes | G06F 18/22 |
| 2021/0117786 | A1* | 4/2021 | Schwarz | G06F 18/22 |

(Continued)

FOREIGN PATENT DOCUMENTS

| | | | |
|---|---|---|---|
| WO | 2020167316 | A1 | 8/2020 |
| WO | 2021195688 | A1 | 10/2021 |
| WO | 2021209614 | A1 | 10/2021 |

OTHER PUBLICATIONS

Chen, et al., "Knowledge-aware Zero-Shot Learning: Survey and Perspective." Published May 10, 2021 by ARXIV. 9 pages. https://arxiv.org/abs/2103.00070v3.

(Continued)

*Primary Examiner* — Tuan A Pham
(74) *Attorney, Agent, or Firm* — Seed Intellectual Property Law Group LLP

(57) ABSTRACT

A system may receive an existing base set of knowledge, train a neural network on the base set of knowledge, deploy the neural network on a new data set, generate, using the deployment, instances of new knowledge, and validate the instances of new knowledge.

16 Claims, 7 Drawing Sheets

(56) References Cited

U.S. PATENT DOCUMENTS

| | | | | |
|---|---|---|---|---|
| 2022/0114456 | A1* | 4/2022 | Nouri | G06F 9/4881 |
| 2022/0147868 | A1 | 5/2022 | Lin | |
| 2022/0180125 | A1* | 6/2022 | Shen | G06V 10/454 |
| 2022/0284343 | A1* | 9/2022 | Ashton Vital Brazil | G06N 5/04 |

OTHER PUBLICATIONS

Shu, et al., "Unseen Class Discovery in Open-World Classification." Published Jan. 17, 2018 by ARXIV. 10 pages. https://arxiv.org/pdf/1801.05609.pdf.

* cited by examiner

700

Terms 710

<MA>: is the manufacturer/vendor of a device

<OS>: is the Operating systems of a device

<MO> is the model of a device

<CL> is the class of a device

<IC> is the name of an IoT Platform/Cloud hosting service

<PS> is the public suffix in a domain name query

Nature 720

<MA> Technologies (in client issuer certificate)

ntp*.<MA>.org (in time synchronization access)

time.<OS>.com (in time synchronization access)

softwareupdates.<MA>.<PS>

<MA>-connect.<IC>.<PS>

*.<MA>.<PS>

*.<MA>.<IC>.<PS>

*.<MA><CL>.<PS>

*\?*model=<MO>_* (in HTTP User Agent field)

FIG. 7

KNOWLEDGE EXPANSION FOR IMPROVING MACHINE LEARNING

BACKGROUND

Aspects of the present disclosure relate to knowledge expansion for improving machine learning.

AI modeling is the creation, training, and deployment of machine learning algorithms that emulate logical decision-making based on available data. AI models provide a foundation to support advanced intelligence methodologies such as real-time analytics, predictive analytics, and augmented analytics.

BRIEF SUMMARY

The present disclosure provides a method, computer program product, and system of knowledge expansion for improving machine learning. In some embodiments, the method includes receiving an existing base set of knowledge, training a neural network on the base set of knowledge, deploying the neural network on a new data set, generating, using the deployment, instances of new knowledge, and validating, the instances of new knowledge.

Some embodiments of the present disclosure can also be illustrated by a computer program product comprising a computer readable storage medium having program instructions embodied therewith, the program instructions executable by a processor to cause the processors to perform a method, the method comprising receiving an existing base set of knowledge, training a neural network on the base set of knowledge, deploying the neural network on a new data set, generating, using the deployment, instances of new knowledge, and validating, the instances of new knowledge.

Some embodiments of the present disclosure can also be illustrated by a system comprising a processor and a memory in communication with the processor, the memory containing program instructions that, when executed by the processor, are configured to cause the processor to perform a method, the method comprising receiving an existing base set of knowledge, training a neural network on the base set of knowledge, deploying the neural network on a new data set, generating, using the deployment, instances of new knowledge, and validating, the instances of new knowledge.

BRIEF DESCRIPTION OF THE DRAWINGS

FIG. 7 illustrates depicts a table of acronyms for different terms and representation of the nature of the terms in destination domain names, in accordance with embodiments.

DETAILED DESCRIPTION

Figure 1:
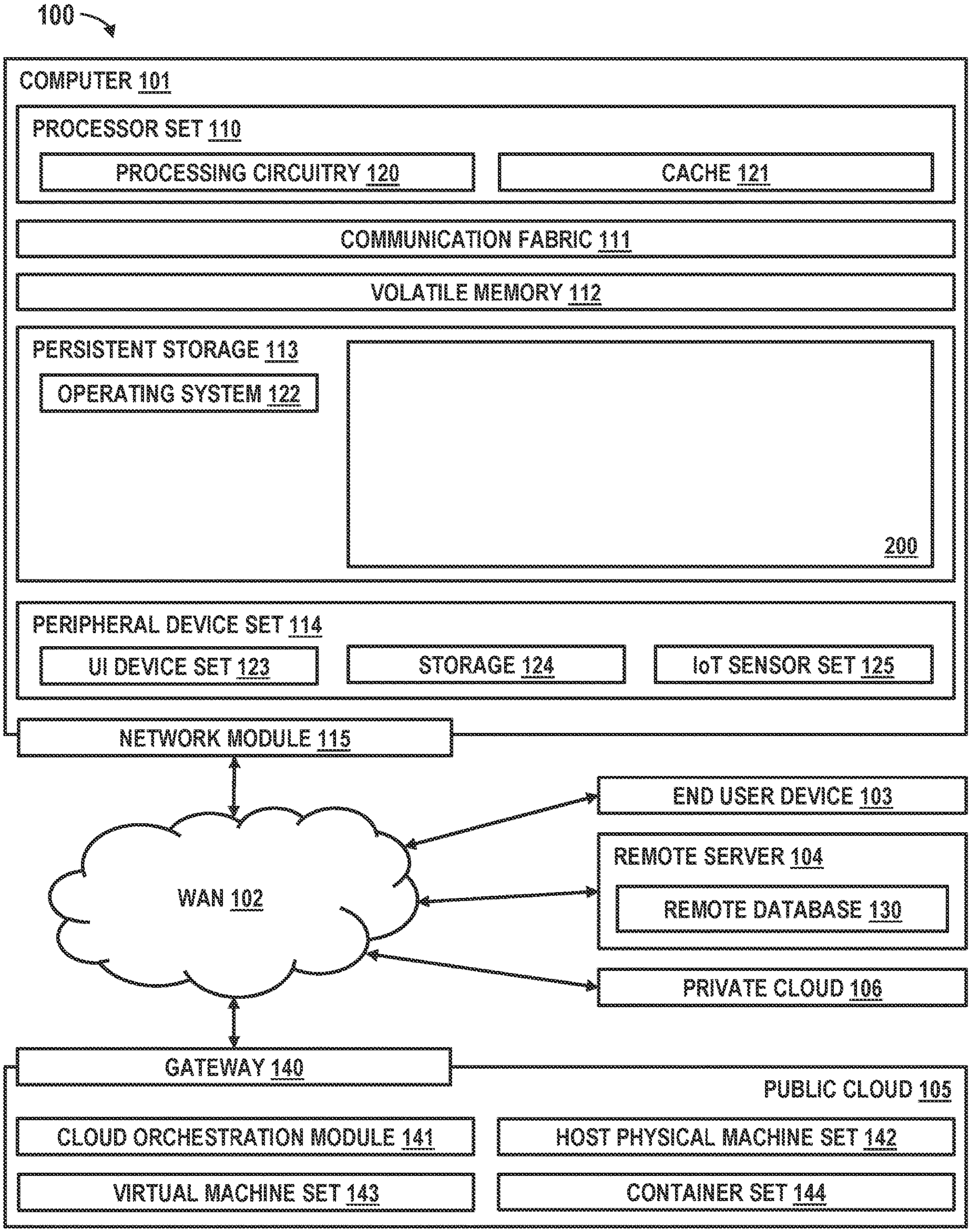
FIG. 1 depicts a computer system according to various embodiments of the present invention.

Aspects of the present disclosure relate to knowledge expansion for improving machine learning. While the present disclosure is not necessarily limited to such applications, various aspects of the disclosure may be appreciated through a discussion of various examples using this context.

Neural networks may be trained to recognize patterns in input data by a repeated process of propagating training data through the network, identifying output errors, and altering the network to address the output error. Training data that has been reviewed by human annotators is typically used to train neural networks. Training data is propagated through the neural network, which recognizes patterns in the training data. Those patterns may be compared to patterns identified in the training data by the human annotators in order to assess the accuracy of the neural network. Mismatches between the patterns identified by a neural network and the patterns identified by human annotators may trigger a review of the neural network architecture to determine the particular neurons in the network that contributed to the mismatch. Those particular neurons may be updated (e.g., by updating the weights applied to the function at those neurons) in an attempt to reduce the particular neurons' contributions to the mismatch. This process is repeated until the number of neurons contributing to the pattern mismatch is slowly reduced, and eventually the output of the neural network changes as a result. If that new output matches the expected output based on the review by the human annotators, the neural network is said to have been trained on that data.

Once a neural network has been sufficiently trained on training data sets for a particular subject matter, it may be used in an operational environment to detect patterns in analogous sets of live data (i.e., non-training data that have not been previously reviewed by human annotators, but that are related to the same subject matter as the training data). The neural network's pattern recognition capabilities can be used for a variety of applications. One common application is classification of input features into one or more classes. For example, a neural network can be trained to recognize devices present in an environment from the observation of packet traffic data generated by a computer in the environment, where each device is a different class. Artificial Neural Networks are an instance of AI models that can be used for these applications, other types of AI models include decision trees, support vector machines, Bayesian models, nearest neighbor models and different embodiments of the disclosure may use different types of AI models.

However, if there are new classes in the operational environment, the AI model may not be able to detect the new classes or find the wrong solutions. For example, if a system has new types of devices present in the operational environment, the neural network may not be able to process the data or it may misclassify the devices. In a detailed experiment that was performed, there were two data sets of packet traffic, the system is trained on the first dataset which contained 8 device types in the environment from where the packet traffic was collected. The system was deployed on a second dataset which was collected in an environment which had 14 device types, 6 of these device types were also present in the first dataset and 8 of the device types were not present in the first dataset. Whereas, the system based on current AI models was only able to classify 6 devices present in the training dataset correctly, and was unable to classify or misclassified 8 devices.

Therefore, aspects of this disclosure relate to a neural network training system for generating instances of new knowledge in addition to normal inference, where this neural network training system validates the instances of new knowledge using a second tier validation step.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a neural network to identify new knowledge in block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the Internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the Internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Artificial neural networks (ANNs) can be computing systems modeled after the biological neural networks found in animal brains. Such systems learn (i.e., progressively improve performance) to do tasks by considering examples, generally without task-specific programming. For example, in image recognition, ANNs might learn to identify images that contain cats by analyzing example images that have been manually labeled as "cat" or "no cat" and using the analytic results to identify cats in other images.

In some embodiments of the present disclosure, neural networks may be used to recognize new sources of knowledge. Neural networks may be trained to recognize patterns in input data by a repeated process of propagating training data through the network, identifying output errors, and altering the network to address the output error. Training data may be propagated through the neural network, which recognizes patterns in the training data. Those patterns may be compared to patterns identified in the training data by the human annotators in order to assess the accuracy of the neural network. In some embodiments, mismatches between the patterns identified by a neural network and the patterns identified by human annotators may trigger a review of the neural network architecture to determine the particular neurons in the network that contribute to the mismatch. Those particular neurons may then be updated (e.g., by updating the weights applied to the function at those neurons) in an attempt to reduce the particular neurons' contributions to the mismatch. In some embodiments, random changes are made to update the neurons. This process may be repeated until the number of neurons contributing to the pattern mismatch is slowly reduced, and eventually, the output of the neural network changes as a result. If that new output matches the expected output based on the review by the human annotators, the neural network is said to have been trained on that data.

In some embodiments, once a neural network has been sufficiently trained on training data sets for a particular subject matter, it may be used to detect patterns in analogous sets of live data (i.e., non-training data that has not been previously reviewed by human annotators, but that are related to the same subject matter as the training data). The neural network's pattern recognition capabilities can then be used for a variety of applications. For example, a neural network that is trained on a particular subject matter may be configured to review live data for that subject matter and predict the probability that a potential future event associated with that subject matter may occur.

In some embodiments, a multilayer perceptron (MLP) is a class of feedforward artificial neural networks. An MLP consists of, at least, three layers of nodes: an input layer, a hidden layer, and an output layer. Except for the input nodes, each node is a neuron that uses a nonlinear activation function. MLP utilizes a supervised learning technique called backpropagation for training. Its multiple layers and non-linear activation distinguish MLP from a linear perceptron. It can distinguish data that is not linearly separable. Also, MLP can be applied to perform regression operations.

However, accurate event prediction is difficult and/or impossible with traditional neural networks since terms are not listed in ground truth repositories. For example, if a manufacturer of a device has not been previously identified, the neural network may not be able to identify such a manufacturer.

The amount of data that may be necessary for accurate prediction analysis may be sufficiently large for many subject matters, such that analyzing the data in a reasonable amount of time may be challenging. Further, in many subject matters, large amounts of data may be made available frequently (e.g., daily), and thus data may lose relevance quickly.

In some embodiments, multiple target predictions may be determined by the overall neural network and combined with structured data in order to predict the likelihood of a value at a range of confidence levels. In some embodiments, these neural networks may be any type of neural network. For example, "neural network" may refer to a classifier-type neural network, which may predict the outcome of a variable that has two or more classes (e.g., pass/fail, positive/negative/neutral, or complementary probabilities (e.g., 60% pass, 40% fail)). For example, pass may denote "no maintenance/service needed" and fail may denote "maintenance/service needed." "Neural network" may also refer to a regression-type neural network, which may have a single output in the form, for example, of a numerical value.

In some embodiments, for example, a neural network in accordance with the present disclosure may be configured to generate a prediction of the probability of a detected network device. This configuration may comprise organizing the component neural networks to feed into one another and training the component neural networks to process data related to the subject matter. In embodiments in which the output of one neural network may be used as the input to a second neural network, the transfer of data from the output of one neural network to the input of another may occur automatically, without user intervention.

In some embodiments, an AI model which is not a neural network may be used in accordance with the present disclosure. Such AI models include decision trees, support vector machines, clustering models among others.

As discussed herein, in some embodiments of the present invention, an aggregate predictor neural network may comprise specialized neural networks that are trained to prepare unstructured and structured data for a new knowledge detection neural network. In some embodiments different data types may require different neural networks, or groups of neural networks, to be prepared for detection of terms.

Figure 2:
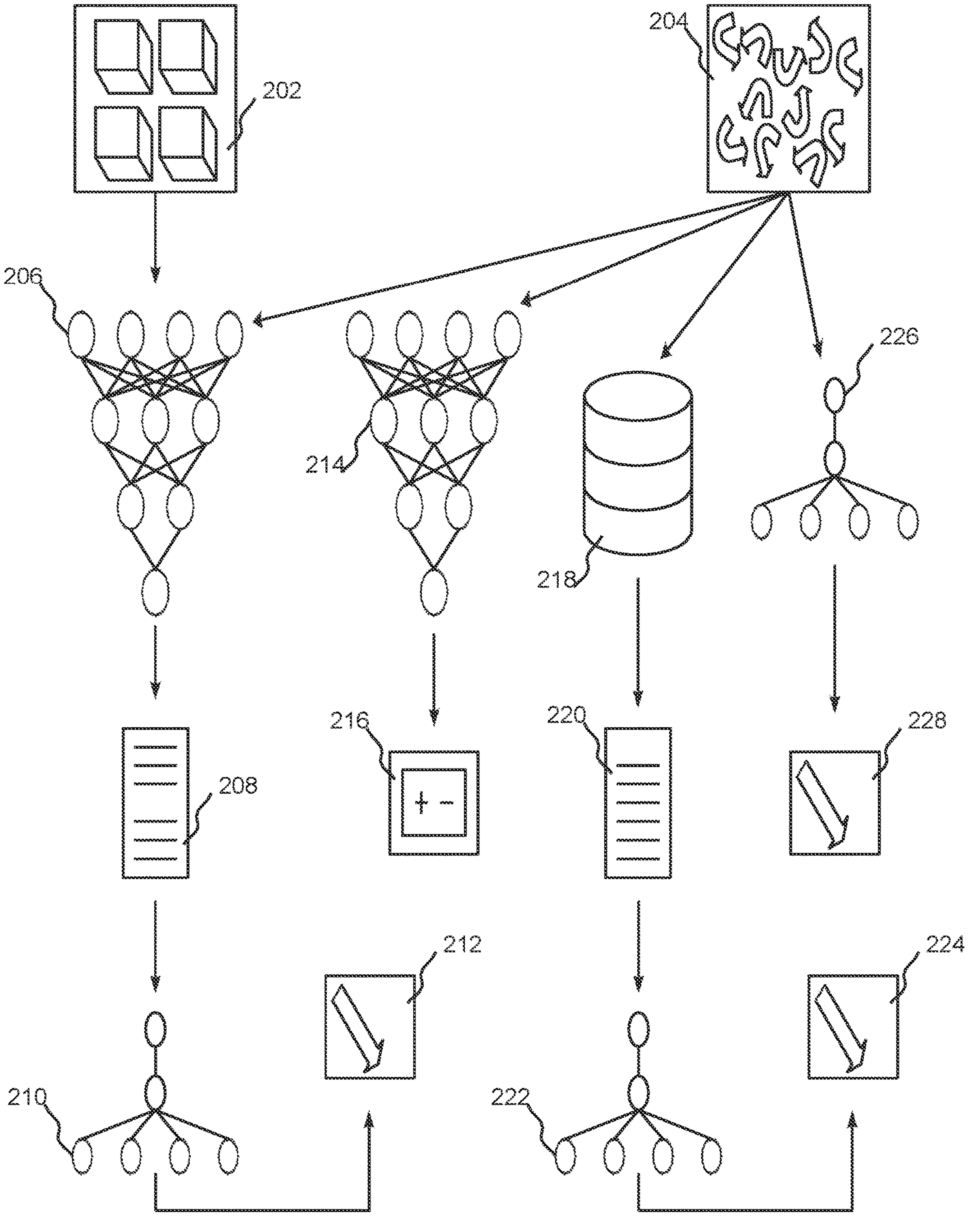
FIG. 2 illustrates one representation of a set of neural networks in a larger aggregate neural network that may prepare input data for a new knowledge detection neural network, in accordance with embodiments.

FIG. 2 illustrates one representation of a set of neural networks in a larger aggregate neural network that may prepare input data for a new knowledge detection neural network (e.g., used to generate the new knowledge in block 200). Structured data 202 and unstructured data 204 represent the base inputs to the neural network. Structured data 202 and unstructured data 204 are inputs into neural network 206, which may be trained in the terms (e.g., vocabulary) of the subject matter to which the structured data 202 and unstructured data 204 pertains. Neural network 206 may also be trained to recognize patterns in the structured data 202 and unstructured data 204, and identify a word list based on those patterns. For example, in some embodiments neural network 206 may comprise an entity model that identifies a list of entities 208 within the unstructured data 204 that may be relevant to a target prediction. In other embodiments, however, other types of word lists are possible.

The list of entities 208 is input into neural network 210. Neural network 210 may be specialized to process the list of entities 208 and output at least one feature vector 212. In some embodiments, feature vector 212 may be a numerical feature vector. In some embodiments, for example, neural network 210 may analyze the unstructured data and determine the contextual relationship of each entity in the list of entities 208 to the remainder of the structured data. Neural network 210 may then assign numerical values to the corresponding word vectors of those entities such that entities with close contextual relationships are situated in close proximity in a vector space. Thus, in some embodiments, feature vector 212 may contextually describe an entity based on the perceived relationships of the entity to the other words used in structured data 204. In some embodiments, feature vector 212 may actually represent multiple feature vectors (e.g., one vector for each entity in the list of entities 208). In other embodiments, only one vector may be produced.

Unstructured data 204 is also input into neural network 214, which may be a sentiment classifier neural network. Neural network 214 may process the unstructured data to identify words used throughout the unstructured data to which sentimental context may be ascribed. In some embodiments, this processing may involve tokenizing the unstructured data (i.e., dividing the data into small sections, such as words, that may be easily identified and processed). In some embodiments, only the most-used words (e.g., the 100 most-used words and the top 10% of words when each word is ranked by usage).

Neural network 214 may output sentiment score 216. Sentiment score 216 may take the form of a value within a predetermined range of values (e.g., 1.0 to −1.0) that measures the type of sentiment and magnitude of sentiment associated with a word in a word list identified from within structural data 204. For example, sentiment score 216 may be the sentiment in structured data 204 that is associated with an entity in the list of entities 208. In some embodiments, list of entities 208 may cross-referenced with the output of neural network 214 to identify relevant sentiment scores. In some embodiments, neural network 214 may also output an average sentiment score of the entire structured data 204. This average sentiment score may also be utilized in prediction analysis.

Unstructured data 204 is also input to concept mapper 218. Concept mapper 218 may comprise a database of entities and semantic “facts” about those entities. Those semantic “facts” may include a list of higher-level concepts associated with the entities in the database. Concept mapper 218 may ingest unstructured data 204 and map the words found therein to a list of concepts associated with those entities. In some embodiments, this may include tokenizing the unstructured data and detecting words found in the tokens that are also found in the database of entities. The concepts that are associated with those words may then be determined based on the relationships in the database, and output as concept list 220.

In some embodiments, entity list 208 may also be input into mapper 218 with, or instead of, unstructured data 204. In those embodiments, concept mapper 218 may match the entities found in entity list 208 with entities found in the database associated with concept mapper 218. Concept associations may be identified for any entities that are also found within the database. The concepts identified by those associations may then be output to concept list 220.

In some embodiments, concept list 220 may also be input into neural network 214 with unstructured data 204. Neural network 214 may then determine a sentiment score 216 for at least one concept in the list of concepts 220. This sentiment score may reflect the sentiment associated with the at least one concept in the unstructured data 204. In some embodiments a separate sentiment score 216 may be determined for each concept in list of concepts 220.

The list of concepts 220 is input into neural network 222. In some embodiments, neural network 222 may be a distinct neural network from neural network 210. In other embodiments neural networks 210 and 222 may be the same network. Neural network 222 may be specialized to process the list of concepts 220 and output at least one feature vector 224. In some embodiments, feature vector 224 may be a numerical feature vector. In some embodiments, feature vector 212 may contextually describe a concept based on the perceived relationships of the concept to the other words used in structured data 204. In some embodiments, feature vector 224 may actually represent multiple feature vectors (e.g., one vector for each concept in the list of concepts 220). In other embodiments, only one vector may be produced.

Unstructured data 204 may also be input into neural network 226. In some embodiments, neural network 226 may be a distinct neural network from neural network 210 and neural network 222. In other embodiments neural networks 210, 222, and 226 may all be the same network. Neural network 226 may specialize in processing the unstructured data and identifying words that, based on their usage or contextual relationships, may be relevant to a target prediction (referred to herein as “keywords”). Neural network 226 may, for example, select keywords based on the frequency of use within the unstructured data 204. Neural network may then vectorize the selected keywords into at least one feature vector 228.

Neural network 226 may also vectorize the words in unstructured data 204, embedding the vectorized words into a vector space. The vector properties may be created such that the vectors of contextually similar words (e.g., based on the usage in unstructured data 204) are located in closer proximity in that vector space than vectors of contextually dissimilar words. Neural network 226 may then select word vectors based on the proximity of those word vectors to other word vectors. Selecting word vectors that are located near many other word vectors in the vector space increases the likelihood that those word vectors share contextual relationships with many other words in unstructured data 204, and are thus likely to be relevant to a target prediction. The words embedded in these word vectors may represent "keywords" of the unstructured data 204.

The word vectors produced and selected by neural network 226 may be output as at least one feature vector 228. In some embodiments, feature vector 228 may be a numerical feature vector. In some embodiments, feature vector 228 may contextually describe a keyword based on the perceived relationships of the keyword to the other words used in unstructured data 204. In some embodiments, multiple feature vectors 228 may be output by neural network 226. For example, neural network 226 may be specialized to vectorize and output as feature vectors the 500 words that are used the most frequently in unstructured data 204. In other embodiments, neural network 226 may be specialized to output the 500 feature vectors that have the closest distances to at least a threshold amount of other feature vectors in the vector space.

In some embodiments, the keyword or keywords embedded in feature vector 228 or feature vectors 216 may be input into neural network 214 with unstructured data 204. Neural network 214 may then determine a sentiment score 216 for at least one keyword. This sentiment score may reflect the sentiment associated with the at least one keyword in the unstructured data 204. In some embodiments a separate sentiment score 216 may be determined for each identified keyword.

In some embodiments, a neural network may utilize some or all of the outputs of neural networks 210, 214, 222, and 226 to predict the probability of a target event occurring. The neural network may be specialized to process a vector or set of vectors into which a word type (e.g., an entity, a concept, or a keyword) has been embedded. The neural network may also be specialized to process a sentiment score for at least one word in associated with at least one vector. The neural network may output a predicted probability that the target event will occur.

Figure 3:
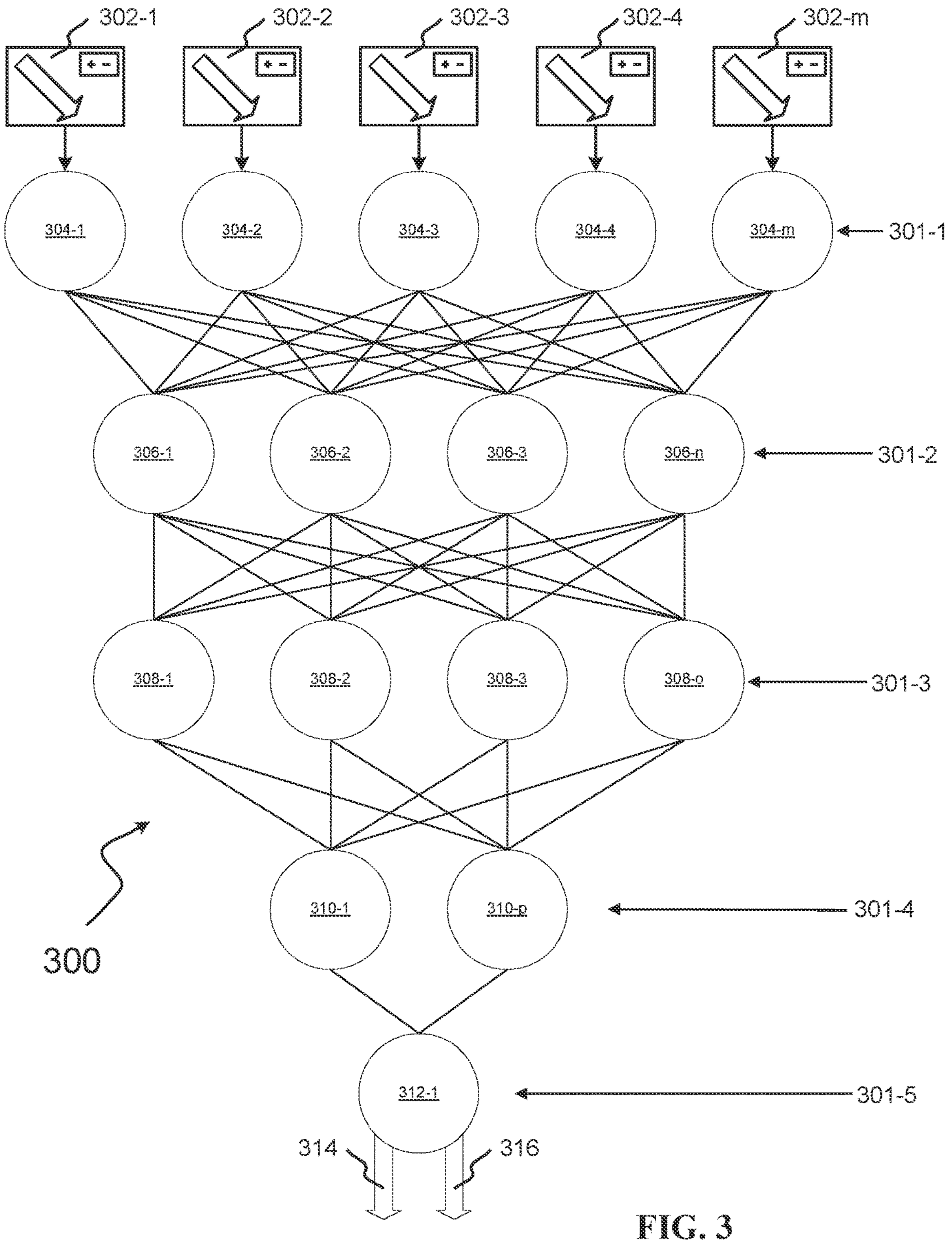
FIG. 3 depicts an example neural network that may be specialized to process a vector or set of vectors associated with a word type (e.g., entity vectors), in accordance with embodiments.

FIG. 3 depicts an example neural network 300 that may be specialized to process a vector or set of vectors associated with a word type (e.g., entity vectors). The neural network 300 may also be specialized to process at least one sentiment score associated with a word embedded within a vector. For example, neural network 300 may be specialized to process one or more outputs of the one or more neural networks disclosed in FIG. 2. In some embodiments, for example, neural network 300 may be specialized to process feature vector 212 (or multiple feature vectors 212) and sentiment score 216 (or multiple sentiment scores 216) of FIG. 2. In other embodiments, neural network 300 may be specialized to process, for example, feature vector 228 (or multiple feature vectors 228) from FIG. 2.

Neural network 300 may be a classifier-type neural network. Neural network 300 may be part of a larger neural network. For example, neural network 300 may be nested within a single, larger neural network, connected to several other neural networks, or connected to several other neural networks as part of an overall aggregate neural network.

Inputs 302-1 through **302-*m* represent the inputs to neural network 300. In this embodiment, 302-1 through 302-*m* do not represent different inputs. Rather, 302-1 through 302-*m* represent the same input that is sent to each first-layer neuron (neurons 304-1 through 304-*m*) in neural network 300. In some embodiments, the number of inputs 302-1 through 302-*m* (i.e., the number represented by m) may equal (and thus be determined by) the number of first-layer neurons in the network. In other embodiments, neural network 300 may incorporate 1 or more bias neurons in the first layer, in which case the number of inputs 302-1 through 302-*m* may equal the number of first-layer neurons in the network minus the number of first-layer bias neurons. In some embodiments, a single input (e.g., input 302-1**) may be input into the neural network. In such an embodiment, the first layer of the neural network may comprise a single neuron, which may propagate the input to the second layer of neurons.

Inputs 302-1 through **302-*m* may comprise a single feature vector that contextually describes a word from a set of unstructured data (e.g., a corpus of natural language sources) and a sentiment score that is associated with the word described by the feature vector. Inputs 302-1 through 302-*m* may also comprise a plurality of vectors and associated sentiment scores. For example, inputs 302-1 through 302-*m* may comprise 100 word vectors that describe 100 entities and 100 sentiment scores that measure the sentiment associated with the 100 entities that the 100 word vectors describe. In other embodiments, not all word vectors input into neural network 300 may be associated with a sentiment score. For example, in some embodiments, 30 word vectors may be input into neural network 300, but only 10 sentiment scores (associated with 10 words described by 10 of the 30 word vectors) may be input into neural network 300**.

Neural network 300 comprises 5 layers of neurons (referred to as layers 304, 306, 308, 310, and 312, respectively corresponding to illustrated nodes 304-1 to **304-*m*, nodes 306-1 to 306-*n*, nodes 308-1 to 308-*o*, nodes 310-1 to 310-*p*, and node 312-1). In some embodiments, neural network 300 may have more than 5 layers or fewer than 5 layers. These 5 layers may each comprise the same amount of neurons as any other layer, more neurons than any other layer, fewer neurons than any other layer, or more neurons than some layers and fewer neurons than other layers. In this embodiment, layer 312 is treated as the output layer. Layer 312 outputs a probability that a target event will occur, and contains only one neuron. In other embodiments, layer 312 may contain more than 1 neuron. In this illustration no bias neurons are shown in neural network 300. However, in some embodiments each layer in neural network 300** may contain one or more bias neurons.

Layers 304-312 may each comprise an activation function. The activation function utilized may be, for example, a rectified linear unit (ReLU) function, a SoftPlus function, a Soft step function, or others. Each layer may use the same activation function, but may also transform the input or output of the layer independently of or dependent upon the ReLU function. For example, layer 304 may be a "dropout" layer, which may process the input of the previous layer (here, the inputs) with some neurons removed from processing. This may help to average the data, and can prevent overspecialization of a neural network to one set of data or several sets of similar data. Dropout layers may also help to prepare the data for "dense" layers. Layer 306, for example, may be a dense layer. In this example, the dense layer may process and reduce the dimensions of the feature vector (i.e., the vector portion of inputs 302-1 through **302-*m*) to eliminate data that is not contributing to the prediction. As a further example, layer 308 may be a "batch normalization" layer. Batch normalization may be used to normalize the outputs of the batch-normalization layer to accelerate learning in the neural network. Layer 310 may be any of a dropout, hidden, or batch-normalization layer. Note that these layers are examples. In other embodiments, any of layers 304 through 310** may be any of dropout, hidden, or batch-normalization layers. This is also true in embodiments with more layers than are illustrated here, or fewer layers.

Layer 312 is the output layer. In this embodiment, neuron 312-1 produces outputs 314 and 316. Outputs 314 and 316 represent complementary probabilities that a target event will or will not occur. For example, output 314 may represent the probability that a target device is in a computer communications infrastructure, and output 316 may represent the probability that a target device is not in the computer communications infrastructure. In some embodiments, outputs 314 and 316 may each be between 0.0 and 1.0, and may add up to 1.0. In such embodiments, a probability of 1.0 may represent a projected absolute certainty (e.g., if output 314 were 1.0, the projected chance that the target device is in the computer communications infrastructure occur would be 100%, whereas if output 316 were 1.0, the projected chance that the target device is not in the computer communications infrastructure would be 100%).

FIG. 3 illustrates an example new knowledge detection neural network with one pattern-recognizer pathway (i.e., a pathway of neurons that processes one set of inputs and analyzes those inputs based on recognized patterns, and produces one set of outputs. However, some embodiments may incorporate a new knowledge detection neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well (e.g., several smaller vectors may merge to create one vector). This merger may increase the ability to identify correlations in the patterns identified among different inputs, as well as eliminate data that does not appear to be relevant.

Figure 4:
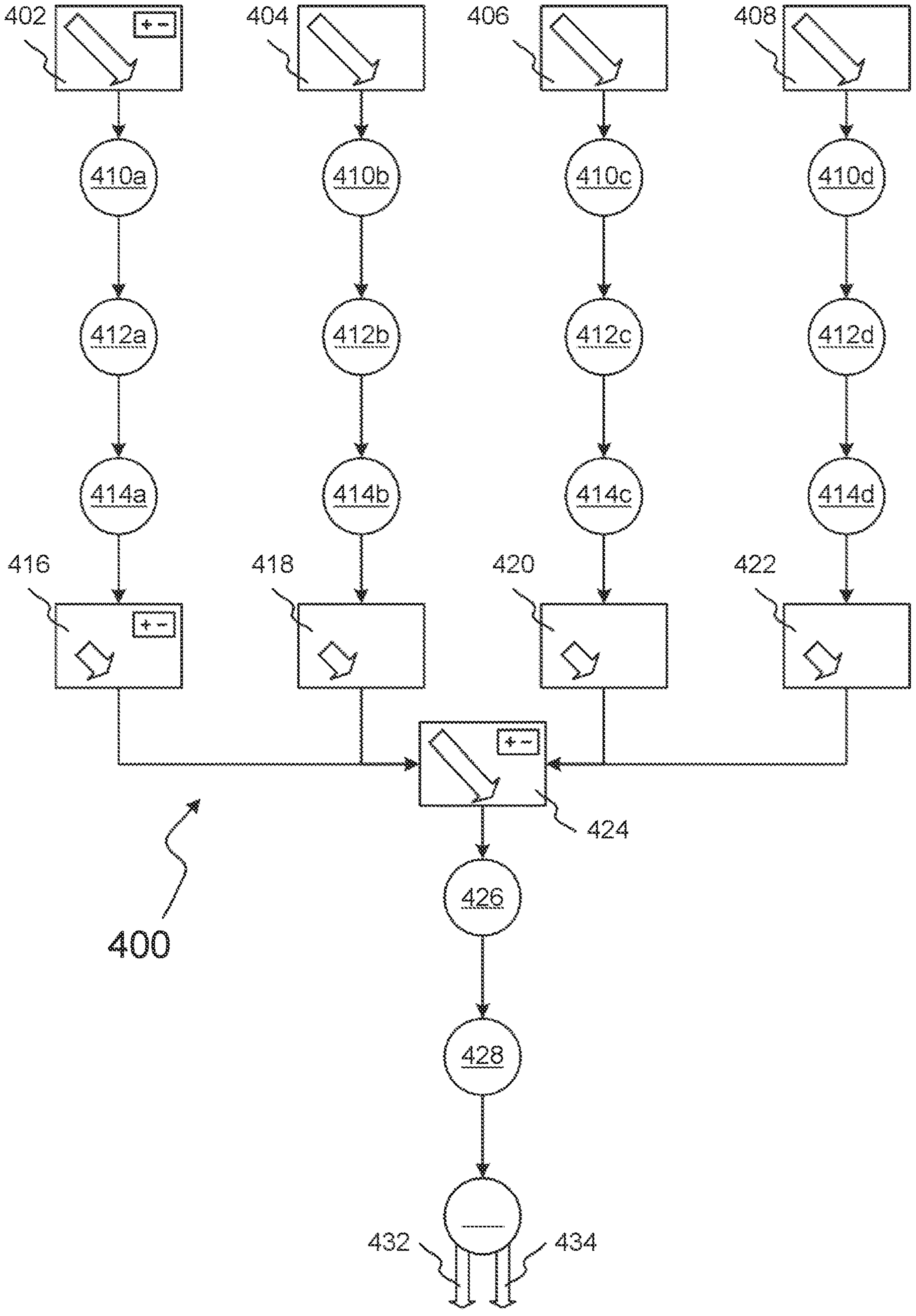
FIG. 4 illustrates an example new knowledge detection neural network with multiple pattern recognition pathways and multiple sets of inputs, in accordance with embodiments.

FIG. 4 illustrates an example new knowledge detection neural network 400 with multiple pattern recognition pathways and multiple sets of inputs. For example, inputs 402, combined with layers **410*a*-414*a* may represent the first several layers of a pattern-recognizer pathway. For example, input 402 may comprise an entity feature vector or multiple entity vectors and at least one sentiment score for at least one corresponding entity. Input 404 may comprise one or more concept feature vectors and input 406 may comprise one or more keyword feature vectors. Input 408 may be, for example, a sentiment feature vector. The sentiment feature vector may, for example, be composed of sentiment scores for a plurality of entities, keywords, and concepts across a corpus of natural-language sources, embedded into a vector form. For example, a sentiment vector may provide sentiment context for each entity in a group of entities. A sentiment vector may also provide an average sentiment context over a group of keywords. In some embodiments, each feature vector in inputs 402 through 408** may be the same length (e.g., 50 dimensions). In other embodiments each feature vector may have a unique length.

Neural network 400 contains, through the first several layers, four pathways. Several pathway layers (i.e., group of neurons that make up the layer in the pathway) are presented for each pathway. For example, the pathway corresponding to input 402 has three layers shown: **410*a*, 412*a*, and 414*a*. Layer 410*a* may consist of, for example, 5 neurons that are unique to layer 410*a*. Layers 410*b*, 410*c*, and 410*d*, of the pathways corresponding to inputs 404, 406, and 408 respectively, may contain 5 corresponding neurons. In other words, the 410 layer of each pathway may contain the same neurons with the same activation function. However, weights distributed among those neurons may differ among the pathways, as may the presence and properties of bias neurons. This may also be true of the 412 layer and 414 layer of each pathway. Each of layers 410*a*-410*d*, 412*a*-412*d*, and 414*a*-414*d*** may be a dropout layer, a hidden layer, and a batch-normalization layer. In some embodiments each pathway may have several more layers than are illustrated. For example, in some embodiments each pathway may consist of 8 layers. In other embodiments, the non-input and non-output layers may be in multiples of three. In these embodiments, there may be an equal number of dropout, hidden, and batch normalization layers between the input and output layers.

The outputs of layers **414*a*-414*d* are outputs 416-422 respectively. Outputs 416-422 represent the inputs 402-408, however the respective feature vectors have been shortened (i.e., the dimensions of the vectors have been reduced). This reduction may occur, in each pathway, at the hidden layers. The reduction in vector dimensions may vary based on implementation. For example, in some embodiments the vectors in outputs 416-422 may be approximately 50% the length of the vectors in inputs 402-408**. In other embodiments, the outputs may be approximately 25% of the length of the inputs. In some embodiments, the length of the output vectors may be determined by the number of hidden layers in the associated pathways and the extent of the vector-length reduction at each hidden layer.

Outputs 416-422 are be combined into a single input/output 424, which may comprise a single vector representing the vectors from outputs 416-422 and the sentiment score obtained from output 416. At this point, all four pathways in the network merge to a single pattern-recognition pathway. This merger may increase the ability to correlate evidence found in each pathway up to this point (e.g., to determine whether patterns being recognized in one pathway are also being recognized in others). This correlation, in turn, may enable the elimination of false-positive patterns and increase the network's ability to identify additional patterns among the merged data. Layer 426 of that pathway may comprise any number of neurons, which may provide inputs for the neurons of layer 428. These layers may provide inputs for the neurons at layer 430, which is the output layer for the network. In some embodiments, layer 430 may consist of a single output neuron. Layer 430 generates two probabilities, represented by output 432 and output 434. Output 432 may be the predicted probability that a target is in the computer communications infrastructure, and output 434 may be the predicted probability that a target device is not in the computer communications infrastructure. In this illustration two layers are presented between input/output 424 and output layer 430. However, in some illustrations more or fewer layers may be present after the pathway merge.

Some embodiments of the present disclosure may obtain a composite projection associated with a subject matter based on several neural-network projections for target events associated with the subject matter and other projections available within structured data. In such embodiments, the probabilities of several related or unrelated potential future events may be projected and combined with structured data. A processor configured to perform large-scale multiple regression analysis may combine the projected probabilities with structure data to determine a composite projection.

Figure 5:
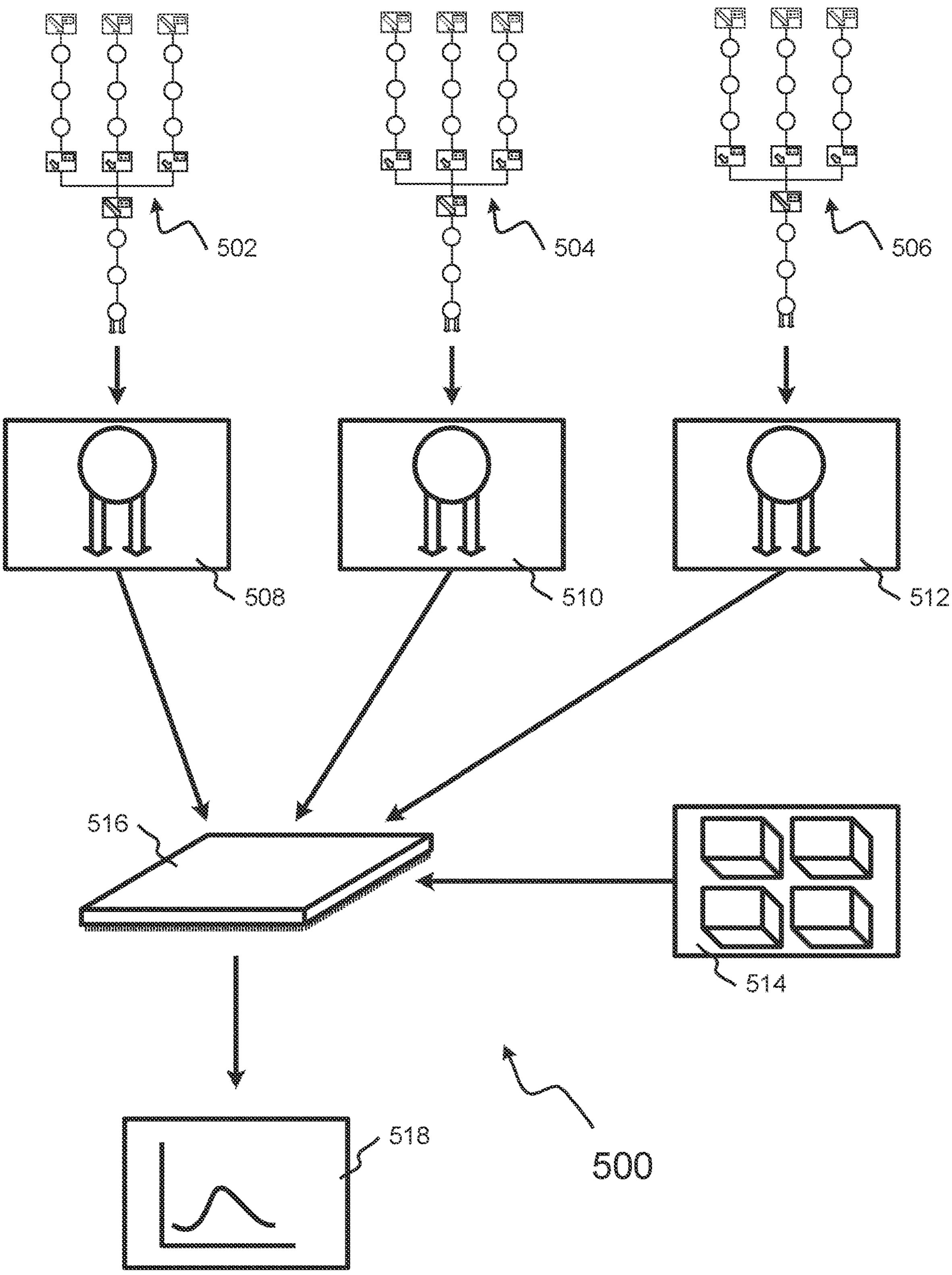
FIG. 5 illustrates a representation of a system that utilizes multiple probability-generation neural networks and structured data to generate a composite projection, in accordance with embodiments.

FIG. 5 illustrates a representation of a system 500 that utilizes multiple probability-generation neural networks and structured data to generate a composite projection. For example, system 500 may be beneficial for identifying patterns in data signaling new knowledge. System 500 utilizes neural networks 502, 504, and 506. Neural networks 502, 504, and 506 may be similar to neural network 400, each comprising multiple pathways similar to neural network 300, and utilizing inputs similar to feature vectors 212, 224, and 228 as well as sentiment score(s) 216. At least one of neural networks 502, 504, and 506 may also utilize a sentiment feature vector similar to the sentiment feature vector of input 408.

Feature vectors may be input into the second pathways of neural networks 502, 504, and 506. The sentiment scores associated with the concepts in the list of concepts may also be determined and input into the second pathways of neural networks 502, 504, and 506 with the concept feature vectors. Relevant keywords may be selected by a neural network based on identified contextual relationships and embedded into keyword feature vectors. A sentiment score may also be determined for each identified keyword. Together, keyword feature vectors and associated sentiment scores may be inputted into the third pattern recognizer pathway in each of neural networks 502, 504, and 506.

In some embodiments, neural networks 502, 504, and 506 may be specialized in predicting the probabilities (e.g., expected values) of different target events. In these embodiments, the lists of entities, keywords, and concepts, that may be relevant to each of neural networks 502, 504, and 506 may differ. For that reason, each of neural networks 502, 504, and 506 may accept different groups of feature vectors.

In some embodiments one or more of neural networks 502, 504, and 506 may specialize in processing at least a fourth vector type. For example, each of neural networks 502, 504, and 506 may comprise a fourth pathway that is specialized in processing a sentiment feature vector.

Neural networks 502, 504, and 506 may output probabilities 508, 510, and 512 respectively. Probabilities 508, 510, and 512 may be any projection of a particular device string or pattern in the data indicates new knowledge. For example, probability 508 may be an indication of a new operating system. Probability 510 may be the probability new manufacturer created a device. Probability 512 may be the probability that a new device is present.

In this illustration of system 500, only three new knowledge detection neural networks have been depicted. However, in some embodiments of system 500 further new knowledge detection neural networks may be utilized. For example, a fourth new knowledge detection neural network may be utilized to determine the projected probability that a new device is connected to a computer communications infrastructure. In other embodiments fewer than three new knowledge detection neural networks may be utilized, such as embodiments that only project a probability that a device is using a new operating system.

Probabilities 508, 510, and 512 are input, with structured data 514, into processor 516, which is configured to perform a multiple-regression analysis. This multiple-regression analysis may be utilized to develop an overall projection 518, which may be calculated in terms of confidence intervals. For example, processor 516 may be utilized to project knew knowledge in a data set on the projected probabilities 508, 510, and 512 associated with any similar projections that may be identified in structured data 514. This new knowledge score may be presented in confidence intervals based on the output of the multiple-regression analysis.

While system 500 was discussed in reference to a composite projection associated with knowledge expansion for improving machine learning, system 500 may be used to generate a composite prediction in many other subject matters.

As used herein, the term "neural network" may refer to an aggregate neural network that comprises multiple sub neural networks, or a sub neural network that is part of a larger neural network. Where multiple neural networks are discussed as somehow dependent upon one another (e.g., where one neural network's outputs provide the inputs for another neural network), those neural networks may be part of a larger, aggregate neural network, or they may be part of separate neural networks that are configured to communicate with one another (e.g., over a local network or over the Internet).

Figure 6:
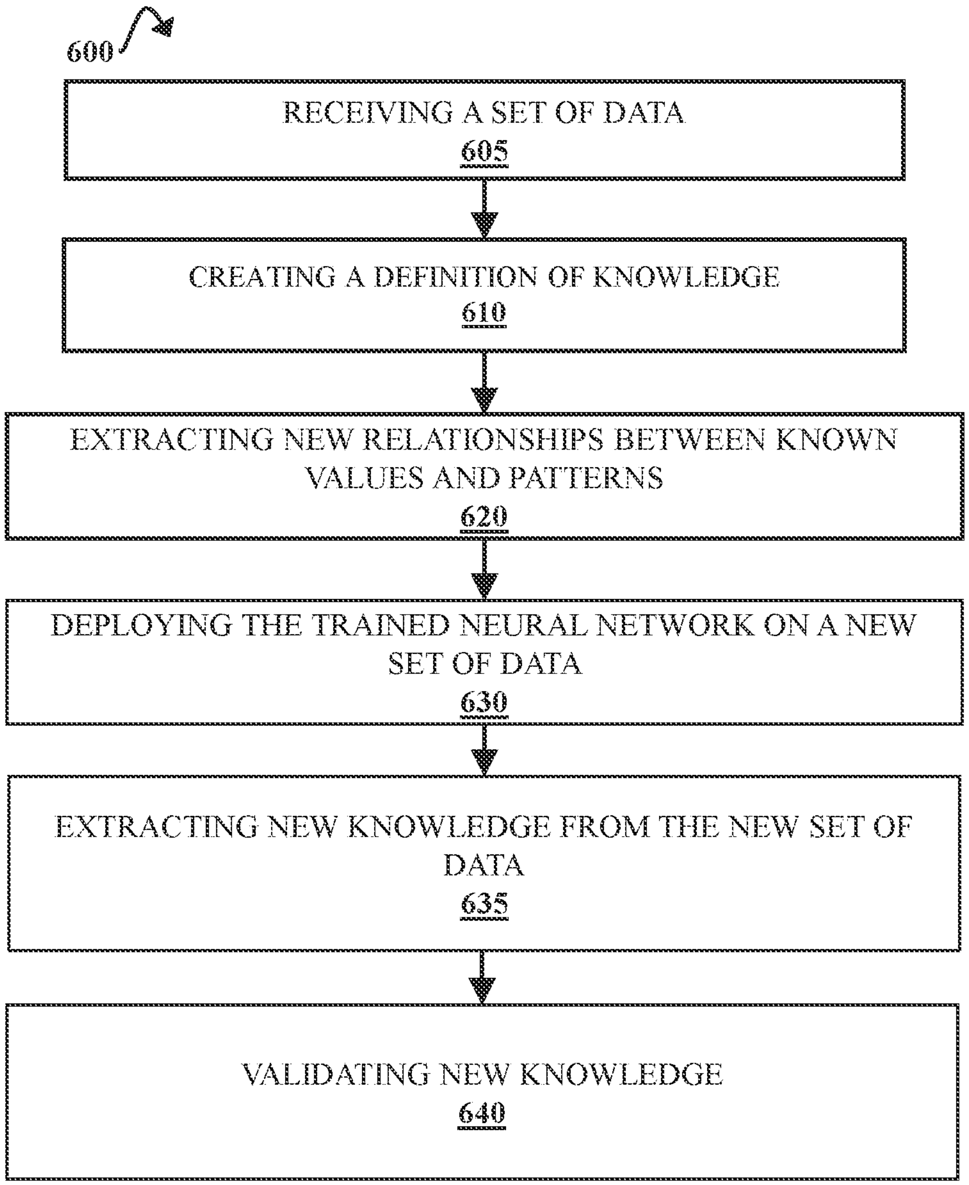
FIG. 6 illustrates an example method of knowledge expansion for improving machine learning for a neural network system, according to various embodiments of the present invention.

FIG. 6 depicts an example method 600 of knowledge expansion for improving machine learning for a neural network system. Operations of method 600 may be enacted by one or more computer systems such as the system described in FIG. 1 above. Method 600 uses a higher level system to analyze new knowledge, validate it, and update the neural network. Examples provided may be for detecting devices on a computer communications infrastructure, but the neural network system described may be used for other applications where neural networks are deployed. For the examples, several terms may be used: set of known device manufacturers (e.g., manufacturers, brands, or marketers of devices), set of known types of devices (e.g., tv, camera etc.), known IoT (Internet of things) hosting platforms, known programming sites (e.g., on-line programming question and answer community providing its participants with rapid access to knowledge and expertise of their peers), known OS (operating systems) used by devices (e.g., the software that supports a computer's basic functions, such as scheduling tasks, executing applications, and controlling peripherals), and set of known public suffixes and their meaning (e.g., uk, .au, .com etc.). In some embodiments, the data may consist of known terms (e.g., listed above), and there may new or unknown terms that are also present in the data. The unknown terms may be sources of possible new knowledge.

Method 600 begins with operation 605 of receiving a set of data, for example packet capture (pcap) files also known as packet traces. In some embodiments, the data set may have a classification system where features are strings with named output classes, input features encode the output class name (or variants/synonyms), input features have terms belonging to some category of words, and some patterns for input terms exist. In some embodiments, the neural network may create relationships from the data between strings with output classes and strings with input features. Likewise, the neural network may create relationship rules between terms and categories of works and link terms to patterns that exist in the data.

Method 600 begins with operation 610 of creating a definition of knowledge. In some embodiments, different types of terms may have string representation of a particular nature in destination domain names. For example, FIG. 7 depicts a table of acronyms 710 for different terms and representation of the nature 720 of the terms in destination domain names as will be described herein. In FIG. 7, "*' represents any string of characters. For example, ntp* may match ntpalexa, ntpibm, or ntpbmc. In FIG. 7 "?" represents any character or a single occurrence of the character preceding it. The terms in angular brackets "< >" are placeholders for knowledge terms.

Method 600 continues with operation 620 of extracting new relationships between known values and patterns in the data that may be used to identify new values (referred to as knowledge herein). For example, for one or more terms the system may identify existing patterns (arrangements of terms in the data that frequently occur across one or more terms). In some embodiments, a neural network is trained on an existing set of data to recognize patterns in the data related to values for the known terms. For example, a device for term (e.g., a certain manufacturer, operating system, or cloud hosing) is present, a string or pattern of data is identified in a data, but when the term is not present the string or pattern of data is not present. In some embodiments, new patterns may be mined from how terms are positioned with respect to each other. For example, if a certain manufacture and a certain operating system are present with a pattern in the data, the neural network may identify the pattern and identifier for that manufacturer and operating system. In a specific example, for a pattern, <MA>.<IC>.<PS>, the system may know that <MA> includes Vera and <PS> includes "com." If the system identifies a string vera.mios.com, the neural network may infer that mios is a new cloud hosting platform even if it does not have pre-existing awareness of the term mios.

In some embodiments, a pattern is a known arrangement in which know terms occur. For example, in a certificate field, the name of the manufacturer of a device followed by the words Inc or Technology or Company may be found. Another pattern is that devices tend to access sites which end with the name of the device manufacturer followed by a dot followed by a public suffix—the pattern being <manufacturer>.<publicsuffix>, or that they frequently address destinations with the names of <manufacturer>.<cloud-provider>.<public-suffix>. Here each of the terms inside the angular brackets are some frequently occurring terms.

In some instances, the neural network may identify devices present from the input packet traces, identify client browsers based on user agent strings, identify the behavior of users based on contents of uniform resource identifier (uri) strings, identify the location where a packet trace has been collected, and/or classify class of customer complaint problem in chat-bots of telecom operators.

In some embodiments, a neural network or another AI model is used to determine the output classes, while another neural network or AI model is used to mine patterns from the occurring data sequences, while a third neural network or AI models performs the task of validating the set of new knowledge that results from the system.

Method 600 continues with operation 630 of deploying the trained neural network on a new set of data with unknown terms. In some embodiments, the system extracts relationships between output classes and embedded patterns. The neural network is configured to use a set of knowledge with the set of known output classes and how the class is embedded in features (patterns) to determine the presence of one or more entities (e.g., devices, vendors, manufacturers, users, etc.) in a given data set. For example, the knowledge may comprise a set of known vendors (some may be in learning traces), a set of known public suffixes (embedded in features like domain system name (dns) queries/destinations domain names), and a set of known IoT platforms (embedded in features like dns queries/destinations domain names). Extracting relationships between output classes and embedded patterns allows for previously unidentified output classes to be identified, where current state of the art systems might not be able to even detect that an entity may be there.

Method 600 continues with operation 635 of extracting new knowledge from the new set of data. In some embodiments, with computer communications infrastructure traffic analysis, many input features consist of strings and output is embedded in the strings. For example, for an output label the system may use device manufacturer and for an input feature the system may use domain name query. A destination accessed as apicom.netdevice.net may have a device maker "Netdevice" where other destinations have had the device maker listed in the destination. In some instances, the system may use device type as an output label and the system may use an input feature of web uri accessed. For example, for the uniform resource identifier (uri): "uri":"/fling/announce?\u0026guid=7b11bc0639cb5d6e7cf8b1e82db6ca 6ed5c84ed8 \u0026service=cid\u0026private_ip=172.16.2.126\u0026dev_name=\u0026dev_description=40\u00 22 Class 1080P 60 Hz 2D LED HD TV . . . brand=XYZ . . . firmware version=01.00.13 . . . the system may identify a device as XYZ TV (firmware) where other devices have had the manufacture identified in the web uri. In some instances, for an output label the system may use an OS of the device and for an input feature the system may use a fully-qualified domain name (FQDN) of destination in a transmission control protocol (TCP) of a connection request. For example, robotix.clients.giggle.com the OS is robotix where other OS have been identified in a TCP. In another instance, for an output label the system may use a location of a device and for an input feature the system may use the network time protocol (NTP) server destination. For example, for a destination of ntp.pool.org.uk, the device is likely located in UK, where previous devices have had a country code listed in NTPs.

In some embodiments, the system may be trained to use one or more feature filters to eliminate superfluous details, eliminating data that is unsuitable for adding to new knowledge. For example, the system may be trained to eliminate names of vendors such as www, api, xx, ubuntu, OS, etc. Some example filters may include skip list filters, blank/invalid value filters, and threshold filters. In some instances, a skip list filter may eliminate features that match a known list of items to skip. For example, prefix filters may eliminate features that match a known list of prefixes and suffix filters may eliminate features that match a known list of suffixes. In some instances, blank/invalid value filters remove features that are blank, missing or malformed, and in some instances threshold filters may eliminate features that are infrequently measured over some unit of time.

Method 600 continues with operation 640 of validating new knowledge that is generated. In some embodiments, the validation may be done by looking up the terms included in the new knowledge against a dictionary or a list present on the Internet. In some embodiments, the validation may be done by collecting information about that term from the Internet, and passing that information through a neural network which produces a binary decision of whether the term is valid for a category of knowledge. As an example, the system may look up an unknown term Rxyz (fictional example name) with information obtained about the term Rxyz from the informationpedia (fictional information site), and pass that content through a neural network to determine if it means a manufacturer. In other embodiments, the validation may be done by appending suffices like .com and .net to the new knowledge term and searching for it on an Internet search engine. In some embodiments, the term may be searched in multiple Internet engines, and the results passed through an AI model to determine the category. In some embodiments, the validation process may require human intervention. In some embodiments, the validating may be done after converting terms of the new knowledge into different terms using a mapping table. For instance, they system may convert a maker name to a manufacturer. For example, manufacturerXsmartcam and manufacturerXelectronics may be mapped to manufacturer X when reporting or validating.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
a memory; and
a processor in communication with the memory, the processor being configured to perform a process comprising:
receiving an existing base set of knowledge that has been structured, classified, and annotated;
training a neural network on the base set of knowledge by propagating the base set through the neural network, identifying output errors based on comparisons with expected results, and updating weights applied to weighting functions of respective neurons that contributed to the output errors to reduce future contributions to the output errors;
deploying the neural network by applying the trained network to a non-training data set that has not been previously reviewed or annotated and that is not included in the base set of knowledge;
filtering, using a filter, the non-training data set to remove superfluous data, wherein the filter is selected from a group consisting of a skip list filter, an invalid value filter, and a threshold filter;
generating, using the deployment, instances of new knowledge from the non-training data set; and
validating the instances of new knowledge.

2. The system of claim 1, wherein the process further comprises:
repeating the generating until no new knowledge is generated.

3. The system of claim 1, wherein the validating further comprises:
comparing new knowledge against searches conducted on the Internet.

4. The system of claim 3, wherein the validating further comprises:
using the neural network to determine if a term in the new knowledge belongs to a category.

5. The system of claim 1, wherein the process further includes:
extracting relationships between output classes and embedded patterns.

6. The system of claim 1, wherein training of the neural network uses a supervised learning process comprising backpropagation, wherein the base set of knowledge is used iteratively, in conjunction with the instances of the new knowledge, to adjust neuron weights across multiple layers of the neural network until output patterns converge with expected patterns.

7. The system of claim 1, wherein the neural network is selected from the group consisting of decision trees, support vector machines, Bayesian models, and nearest neighbor models.

8. The system of claim 1, wherein the validating comprises comparing the new knowledge against one or more external information sources including dictionaries, Internet searches, or mapping tables, and using an AI model or human review to determine whether the new knowledge belongs to a category of knowledge.

9. The system of claim 1, wherein the process further comprises detecting, using a pattern-recognizer pathway on data from the deployment, correlations in patterns, wherein the pattern-recognizer pathway is a pathway of neurons that analyzes inputs based on recognized patterns.

10. A method comprising:
receiving an existing base set of knowledge that has been structured, classified, and annotated;
training a neural network on the base set of knowledge by propagating the base set through the neural network, identifying output errors based on comparisons with expected results, and updating weights applied to weighting functions of respective neurons that contributed to the output errors to reduce contributions to the output errors;
deploying the neural network by applying the trained network to a non-training data set that has not been previously reviewed or annotated and that is not included in the base set of knowledge;
filtering, using a filter, the non-training data set to remove superfluous data, wherein the filter is selected from a group consisting of a skip list filter, an invalid value filter, and a threshold filter;
generating, using the deployment, instances of new knowledge from the non-training data set; and
validating the instances of new knowledge.

11. The method of claim 10, wherein the method further comprises:

repeating the generating until no new knowledge is generated.

12. The method of claim 10, wherein the validating further comprises:

comparing new knowledge against searches conducted on the Internet.

13. The method of claim 12, wherein the validating further comprises:

using the neural network to determine if a term in the new knowledge belongs to a category.

14. The method of claim 10, wherein the method further includes:

extracting relationships between output classes and embedded patterns.

15. A computer program product comprising a computer readable storage medium having program instructions embodied therewith, the program instructions executable by a processor to cause the processor to perform a method, the method comprising:

receiving an existing base set of knowledge that has been structured, classified, and annotated;

training a neural network on the base set of knowledge by propagating the base set through the neural network, identifying output errors based on comparisons with expected results, and updating weights applied to weighting functions of respective neurons that contributed to the output errors to reduce contributions to the output errors;

deploying the neural network by applying the trained network to a non-training data set that has not been previously reviewed or annotated and that is not included in the base set of knowledge;

filtering, using a filter, the non-training data set to remove superfluous data, wherein the filter is selected from a group consisting of a skip list filter, an invalid value filter, and a threshold filter;

generating, using the deployment, instances of new knowledge from the non-training data set; and validating the instances of new knowledge.

16. The computer program product of claim 15, wherein the method further comprises:

repeating the generating until no new knowledge is generated.

* * * * *